Feb. 7, 1950     A. F. FEASTER     2,496,583
TOOL POST
Filed March 29, 1946
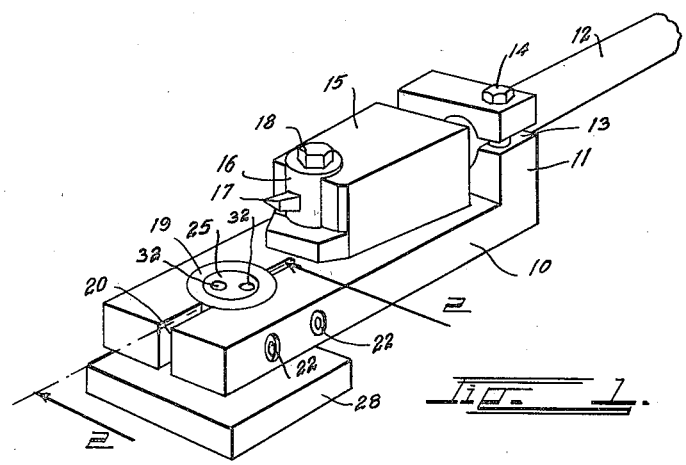
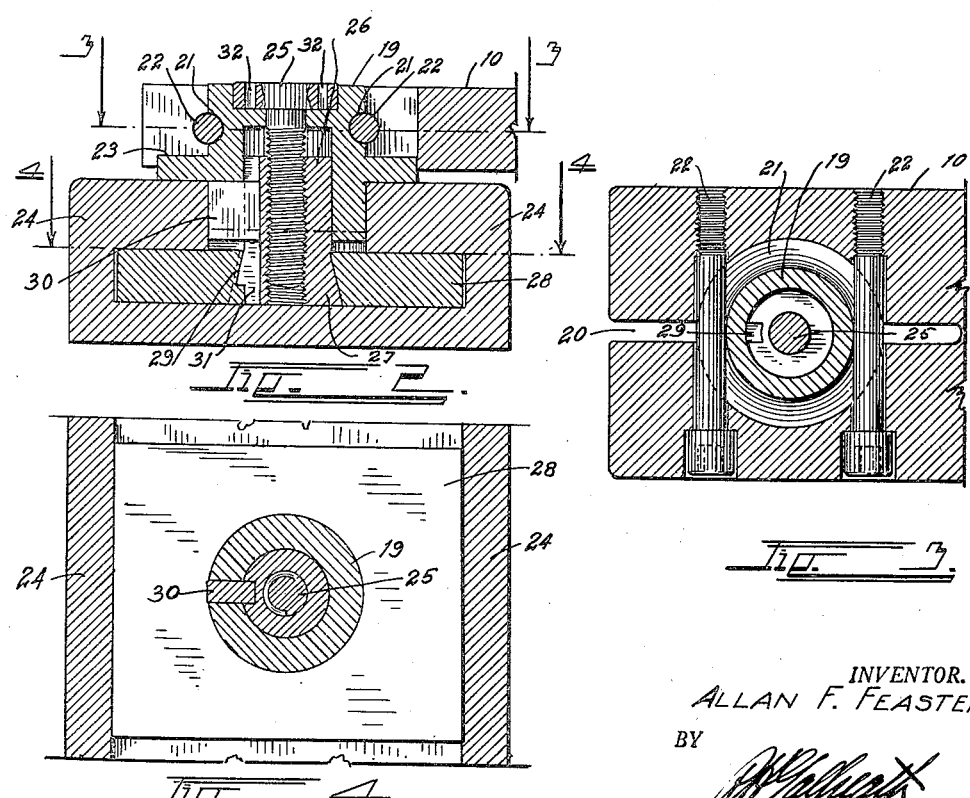
INVENTOR.
ALLAN F. FEASTER.
BY
ATTORNEY.

Patented Feb. 7, 1950

2,496,583

UNITED STATES PATENT OFFICE 2,496,583

TOOL POST

Allen Farris Feaster, Boulder, Colo.

Application March 29, 1946, Serial No. 658,146

3 Claims. (Cl. 82—36)

This invention relates to a tool post for lathes and the like, and is more particularly designed as an improvement over the tool post illustrated in applicant's co-pending application, Serial No. 603,762, now Patent No. 2,460,342, granted February 1, 1949.

It was found, when using the tool post of the co-pending application, that certain lathes would be encountered having thicker and heavier tool slides than others. If the device were made to fit the thicker slides, it could not be held rigidly in the thinner slides. This invention is designed to overcome these differences.

The principal object of this invention is to provide mounting means for tool posts of this type by means of which it can be rigidly mounted in tool slides of differing sizes and differing thicknesses.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of a tool post employing the improved mounting means;

Fig. 2 is a fragmentary, longitudinal section therethrough, taken on the line 2—2, Fig. 1, with a typical lathe tool slide illustrated in place thereon;

Fig. 3 is a horizontal section, taken on the line 3—3, Fig. 2; and

Fig. 4 is a horizontal section, taken on the line 4—4, Fig. 2.

In Figs. 2 and 4 a typical lathe tool slide is illustrated at 24 provided with the conventional dovetailed tool slot. In Figs. 1 and 3, the tool slide has been omitted.

The tool post comprises a base frame member 10 having an upstanding clamping block 11 formed on one of its extremities. The block 11 is drilled to receive a tool bar 12, the opening for receiving the bar being split, as shown at 13. The bar may be clamped in any desired position by means of a clamp screw 14 which acts to contract the split 13. The bar 12 terminates in a tool head 15 which is slidably mounted on the base frame 10. The tool head carries a cylindrical tool holder 16 in which a cutting tool 17 may be locked in any desired position by means of a lock screw 18.

The improved mounting means comprises a bearing spool 19 which passes through a vertical receiving opening adjacent one extremity of the base frame 10, the receiving opening being split, as indicated at 20. The spool 19 is formed with a circumferential groove 21 of semi-circular cross-section at a point mid-way through the frame 10. A pair of locking and clamping screws 22 pass horizontally through the frame 10 and across the split 20 therein. These screws extend into the groove 21 at opposite sides of the spool 19, as shown in Figs. 2 and 3, to prevent removal of the frame 10 from the spool.

The spool 19 is formed with a supporting flange 23 thereon which fits into a counterbore in the bottom of the frame 10. It will be noted that the flange 23 rests upon the top of the tool slide 24, while the lower portion of the spool 19 extends into the slot of the slide.

The spool 19 is clamped to the slide 24 by means of a clamp screw 25. The clamp-screw 25 extends into a hollow stud 26, the lower portion of which is formed with a conical head 27. The head 27 is positioned in a conical socket in a foot plate 28 which rides in the dove-tailed groove of the slide 24. It will be noted that when the screw 25 is tightened, it will act to draw the stud 26 upwardly, drawing the conical head 27 into the socket of the foot plate 28 and acting to clamp the tool slide 24 between the foot plate 28 and the flange 23 so that the spool 19 is firmly locked in position, regardless of the size and thickness of the tool slide 24 or the depth of the slot therein.

The stud 26 is formed with a vertical key way 29 extending throughout its length. The spool 19 is provided with a key 30 which rides in the key way 29 and prevents relative rotation between the spool and the stud. The stud is prevented from rotating in the foot plate 28 by means of a key 31 which is extruded from the metal of the plate 28 and extends into the key way 29.

A pair of spanner wrench sockets 32 are formed in the head of the screw 26 by means of which it may be tightened or loosened. The spool 19 and the head of the screw 25 are formed flush with the top surface of the main frame 10 so that the tool block 15 may move thereover without interference.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for mounting a tool post having a frame member, on the slotted tool slide of a lathe comprising: a bearing spool extending vertically through said frame member adjacent one extremity thereof; means for clamping said frame to said spool; a flange formed on said spool positioned to rest on the tool slide; a foot plate positioned to slide in the slot of said tool slide; a hollow stud extending upwardly from said foot plate; and a clamp screw threaded downwardly through said spool into said stud so that rotation of the clamp screw will draw said foot plate toward said flange to clamp the tool slide therebetween.

2. Means for mounting a tool post having a frame member, on the slotted tool slide of a lathe comprising: a bearing spool extending vertically through said frame member adjacent one extremity thereof; means for clamping said frame to said spool; a flange formed on said spool positioned to rest on the tool slide; a foot plate positioned to slide in the slot of said tool slide; a hollow stud extending upwardly from said foot plate; a clamp screw threaded downwardly through said spool into said stud so that rotation of the clamp screw will draw said foot plate toward said flange; and means for preventing relative rotation between said spool and said stud.

3. Means for mounting a tool post having a frame member, on the slotted tool slide of a lathe comprising: a bearing spool extending vertically through said frame member adjacent one extremity thereof; means for clamping said frame to said spool; a flange formed on said spool positioned to rest on the tool slide; a foot plate positioned to slide in the slot of said tool slide; a hollow stud extending upwardly from said foot plate; a clamp screw threaded downwardly through said spool into said stud so that rotation of the clamp screw will draw said foot plate toward said flange; means for preventing relative rotation between said spool and said stud; and means for preventing relative rotation between said stud and said foot plate.

ALLEN FARRIS FEASTER.

REFERENCES CITED

The following references are of record in the file of this patent:

UNITED STATES PATENTS

| Number | Name | Date |
|---|---|---|
| 1,314,911 | Stephenson | Sept. 2, 1919 |
| 2,374,477 | Feaster | Apr. 24, 1945 |
| 2,460,342 | Feaster | Feb. 1, 1949 |